Sept. 5, 1939.　　　　H. J. HOOD　　　　2,172,246
ENLARGING APPARATUS
Filed Aug. 25, 1937
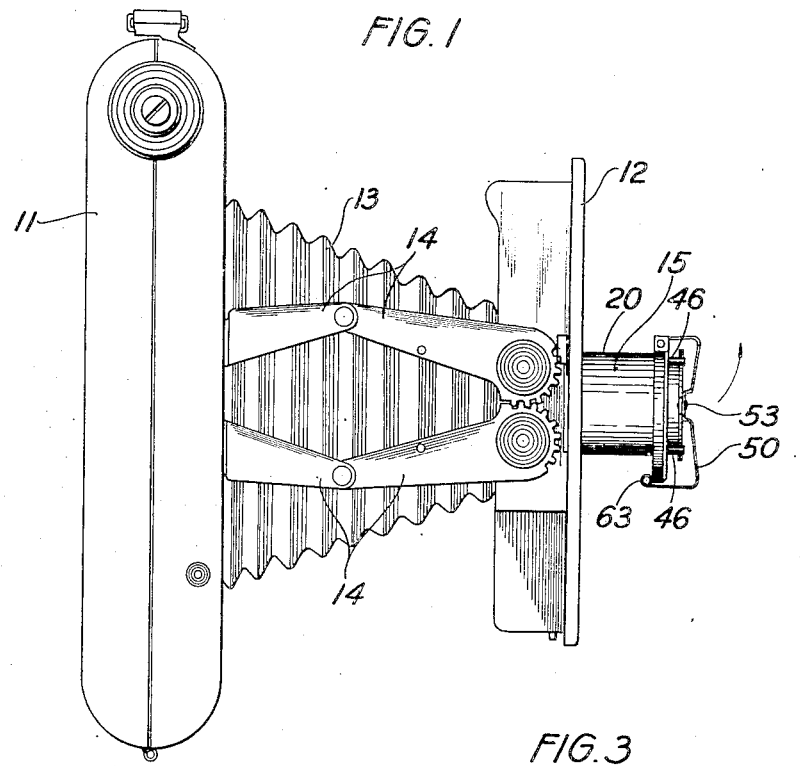
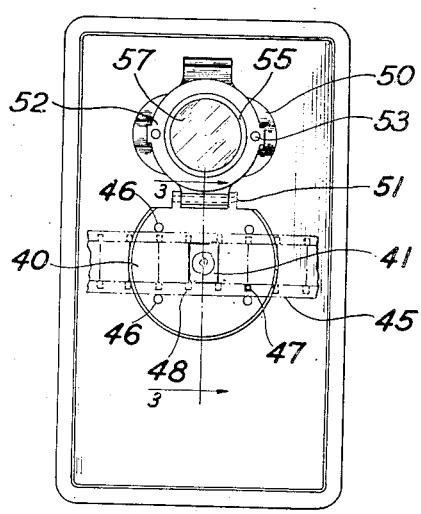
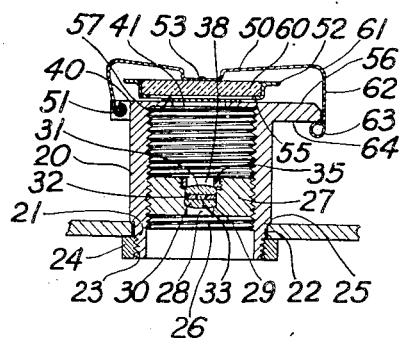
Henry J. Hood
INVENTOR.
BY
ATTORNEYS Patented Sept. 5, 1939

2,172,246

UNITED STATES PATENT OFFICE 2,172,246

ENLARGING APPARATUS

Henry J. Hood, Rochester, N. Y., assignor to Eastman Kodak Company, Rochester, N. Y., a corporation of New Jersey Application August 25, 1937, Serial No. 160,862

8 Claims. (Cl. 88—24)

The present invention relates to an enlarging apparatus, and more particularly to a device for making enlarged negatives of single frames of 16 mm. or other small film which have been processed to a positive.

An object of the invention is the provision of an enlarging device of the class described which is adapted for use with miniature picture areas or frames in strip form.

Another object of the invention is the provision of a device for accurately positioning and holding such single frames so that an enlargement thereof may be made.

A further object of the invention is the provision of a device of this class in which the separate picture frames of a film strip are easily and quickly positioned, and when so positioned are held substantially in a plane to permit enlargements to be made therefrom, yet may be readily moved to bring another picture frame into position for enlarging.

A still further object of the invention is the provision of such a device which is simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a side elevation view of a conventional camera of the folding type, showing the relation thereto of a miniature film holding device constructed in accordance with the present invention;

Fig. 2 is an elevation view of the front portion only of the camera, with the spring clamp or film holding member of the device in open position to show the film positioning and aligning pins;

Fig. 3 is an enlarged sectional view taken through the film holding device substantially on a line 3—3 of Fig. 2, showing the spring clamp or film holding member in closed position.

Similar reference numerals throughout the various views indicate the same parts.

The present invention relates to an apparatus for making enlargements from miniature marginal perforated film. The apparatus is primarily intended for making enlarged negatives of single picture frames or image areas of 16 mm. film which has been processed to a positive. The apparatus comprises broadly a film holding camera of the conventional collapsible or folding type, on which is preferably mounted an optical system in place of the usual camera lens. A film holding and positioning device is mounted on the extensible portion of the camera to hold the miniature film during enlarging. While the device is primarily intended for making enlargemented negatives from 16 mm. positives, it is apparent that the device is equally adapted for making enlarged positives from miniature negatives. The fundamental idea is the making of an enlargement from a single miniature picture frame of a film strip.

Referring now to the drawing and particularly to Fig. 1, there is shown a conventional camera of the folding type which forms the body portion of the enlarger. This camera comprises the usual back or roll film holding portion 11, an extensible front 12 which is secured to the back 11 by means of a usual expanding bellows 13 and lazy tongs 14.

A device, generally indicated by the numeral 15, is secured to the front 12 of the camera and carries the optical system and the film holding member, all of which will be hereinafter more fully described. The device comprises, in the present embodiment, a sleeve member 20 which is formed with a reduced end portion 21 which extends through an opening 22 formed in the front 12, as shown in Fig. 3. The inner end of the portion 21 is threaded, as shown at 23, to receive an internally threaded annular ring or nut 24 which secures the sleeve 20 in position on the front 12, as will be apparent from an inspection of Fig. 3. This ring 24 draws the sleeve 20 toward the front 12 to bring a shoulder 25 thereon into engagement with the front to securely clamp the sleeve in position, all of which is clearly shown in Fig. 3.

The inner surface of the sleeve 20 is threaded, as shown at 26, Fig. 3, to receive a threaded lens barrel 27. This lens barrel has an opening 28 which extends therethrough and which is counterbored or otherwise enlarged to provide a shoulder 29 against which the lower lens 30 may abut. The lens system of the enlarger comprises the lower lens 30 and the upper lens 31 which is spaced from the lower lens by means of a thin diaphragm 32 having a central opening 33 which provides a fixed aperture, as is well known. The lens and diaphragm assembly is held in position in the lens barrel by means of an annular threaded ring 35 which is screwed into an enlarged upper threaded portion of the opening 28, and engages the upper surface of the lens 31. The central opening 38 in the ring 35 is substantially in alignment with the opening 28 of the lens barrel, as shown in Fig. 3. The adjustment of the lens barrel 28 in the sleeve 20 is a factory adjustment, and the camera is, therefore, a fixed focus camera, as the term is known to those in the art. In order to reduce contrast, the upper surface of the diaphragm may be chrome plated or otherwise polished.

The device of the present invention is primarily intended for use with 16 mm. perforated film, and permits selected picture frames or areas of the film strip to be enlarged without necessitating the cutting, splicing, or otherwise damaging the film strip. To this end, the outer end of the sleeve 20 is provided with an enlarged portion or aperture plate 40 which is preferably formed integral with the sleeve 20. It is contemplated, however, that the plate 40 may be separately formed and detachably secured to the sleeve 20 so that the plate may be changed to accommodate different sized miniature film such, for example, 8 mm., and 35 mm. The plate 40 is formed with a central aperture 41 which is positioned in alignment with the lenses 30 and 31 and the diaphragm opening 30, as is well known. This aperture is of such size and shape as to frame a single picture area of the film strip being used.

In use, the miniature marginal perforated film strip 45 is placed on the top of the plate 40, and is slid therealong to bring the desired image area into registry with the aperture 41. A set of aligning pins 46 engages the marginal edges of the strip 45 to laterally align the picture area of the strip with the aperture 41 in the plate 40. In the preferred embodiment, four of these aligning pins are used, but it is contemplated that more or fewer of these pins may be used without departing from the spirit of the invention. A fifth pin 47 enters one of the film perforations 48 and locates the film strip longitudinally with reference to the aperture 41. These positioning and aligning pins thus cooperate to accurately align and position the desired picture area over the aperture 41 to permit enlargements to be made therefrom. This construction also permits the enlargements of the desired picture area to be made from the film strip without necessitating cutting or damaging of the latter. After the desired number of enlargements have been made, the film strip may be rewound onto the film reel, as is well known.

A resilient metal clamp 50, of the shape best shown in Fig. 3, is hingedly connected at 51 to the aperture plate 40. This clamp carries a cup-shaped member 52 which is secured to the clamp by rivets 53, or any other suitable clamping means. When the clamp is in a closed position, the under surface 55 thereof engages the film strip 45 and cooperates with the top 56 of the aperture plate 40 to hold the film strip in flat position during enlargement. The film strip is held between metal members which eliminate the necessity of glass clamping means, the disadvantages of which are well known to those familiar with the art. This cup-shaped member is formed with a central aperture 57 preferably, although not necessarily, larger than the aperture 41 in the plate 40 through which light rays from a light source, not shown, may pass to project the image on the strip 45 onto a sensitized receiving surface, such as a film strip, positioned in the back 11 of the camera. A light diffusing member, preferably in the form of a disk of opal glass 60, is suitably mounted in and movable as a unit with the cup-shaped member 52, as will be apparent from inspection of Figs. 2 and 3.

The free end of the clamp 50 is bent downwardly along the line 61 to form a yieldably depending portion 62, the lower end of which is rolled over, as shown at 63, Fig. 3, to provide a spring or resilient clip which engages the under surface 64 of the plate 40 to yieldably maintain the clamp 50 in closed position, as shown in Fig. 3. When the clamp is to be opened, the clip 63 is moved to the right, as viewed in Fig. 3, to move the clip out of engagement with the plate 40, the portion 62 springing slightly about the line 61 to permit the clip to be thus moved. After the clip has been disengaged from the plate 40, the clamp 50 may be swung upwardly about the hinge 51 to the position shown in Fig. 2.

The film strip 45 may now be lifted off the pin 47 and slid along the plate 40 to bring another picture area into registry with the aperture 41. During this movement, the pins 46 engage the opposite edges of the film strip to maintain the strip in lateral alignment with the aperture 41. After the desired picture area has been brought into position over the aperture 41, one of the film perforations 48 then registers with the positioning pins 47 which then project through the perforation to accurately position the picture area over the aperture 41.

It is thus apparent from the above description that the present invention provides a device for enlarging single picture frames or image areas of a miniature perforated film strip. It is also apparent that the device permits the enlargement of these single picture frames without necessitating the removal thereof from the film strip, the advantages of which are obvious. The arrangement is such that the film strip may be readily, easily, and accurately positioned in registry with the aperture 41 of the plate 40, and is then held in flat position to permit an enlargement to be made therefrom.

While only one embodiment of the invention has been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

I claim:

1. A photographic enlarging apparatus comprising in combination, a fixed focus camera, an apertured plate mounted on the front of said camera and in spaced relation to the lens thereof, means including projecting pins on said plate arranged to engage opposite marginal edges of a film strip for positively aligning and locating a transparent image area of said strip in registry with said aperture, a flat clamping member hingedly secured to said plate and cooperating therewith to hold said area in flat position over said aperture, and a light diffusing disk carried by said member, said member being positioned between said pins when in the film clamping position.

2. A photographic enlarging apparatus comprising in combination, a fixed focus camera, an apertured plate mounted on the front of said camera and in spaced relation to the lens thereof, aligning pins on said plate arranged to engage the edges of a marginal perforated film strip to laterally align an image area thereof with said aperture, a positioning pin on said plate arranged to project through one of the marginal perforations to locate a single image area of said strip in registry with said aperture, and means cooperating with said plate for holding said area in flat position over said aperture.

3. A photographic enlarging apparatus comprising in combination, a fixed focus camera, an apertured plate mounted on the front of said camera in spaced relation to the lens thereof, a series of pins on said plate arranged to engage marginal edges of a film strip to laterally align the strip over said aperture, means independent of but cooperating with said pins for accurately registering an image area of said strip with said aperture, means for holding said area in flat position over said aperture, and light-diffusing means carried by said holding means.

4. A photographic enlarging apparatus comprising in combination, a fixed focus camera, an apertured plate mounted on the front of said camera and in spaced relation to the lens thereof, means for positioning a single transparent image area of a film strip in registry with said aperture, a spring clamp hingedly secured to said plate, a cup shaped member mounted on said clamp and arranged to engage said strip to hold said area in flat position over said aperture, and a light-diffusing member carried by said cup-shaped member.

5. A photographic enlarging apparatus comprising in combination, a fixed focus camera, an apertured plate mounted on the front of said camera and in spaced relation to the lens thereof, aligning pins on said plate arranged to engage the edges of a marginal perforated film strip to laterally align an image area thereof with said aperture, a positioning pin on said plate arranged to project through one of the marginal perforations to locate a single image area of said strip in registry with said aperture, means for holding said area in flat position over said aperture, and light-diffusing means carried by said holding means.

6. A photographic enlarging apparatus comprising in combination, a fixed focus camera, an apertured plate mounted on the front of said camera and in spaced relation to the lens thereof, aligning pins on said plate arranged to engage the edges of a marginal perforated film strip to laterally align an image area thereof with said aperture, a positioning pin on said plate arranged to project through one of the marginal perforations to locate a single image area of said strip in registry with said aperture, a spring clamp hingedly secured to said plate, a cup-shaped member mounted on said clamp and arranged to engage said strip to hold said image area in flat position over said aperture, a spring clip on said clamp for maintaining said cup in engagement with said strip, and a light-diffusing member mounted in said cup.

7. A photographic enlarging apparatus comprising in combination, a body portion, a sleeve secured to said body portion, a lens mounted in said sleeve, an apertured plate carried by the outer end of said sleeve, pins on said plate for aligning and locating a single image area of a marginal perforated film strip in registry with said aperture, a spring clamp hingedly secured to said plate, a cup-shaped member mounted on said clamp and arranged to engage said strip to hold said area in flat position over said aperture, and a light-diffusing member carried by and movable as a unit with said cup-shaped member.

8. A photographic enlarging apparatus comprising in combination, a foldable body portion, an extensible section on said body portion, a sleeve secured to said extensible section, a lens barrel mounted in sleeve, a lens secured in position in said barrel, a fixed diaphragm adjacent said lens, an apertured plate carried by the outer end of said sleeve, the aperture in said plate being in optical alignment with said lens and said diaphragm, aligning pins on said plate arranged to engage the opposite edges of a marginal perforated film strip to laterally align an image area thereof with said aperture, a positioning pin on said plate arranged to extend through one of the marginal perforations of said strip to locate a single image area thereof in registry with said aperture, a spring clamp hingedly mounted on said plate, a cup-shaped member carried by said clamp and arranged to engage said strip to hold said area in flat position over said aperture, a light-diffusing glass carried by said cup-shaped member, and a spring clip on said clamp adapted to engage said plate to releasably hold said cup-shaped member in engagement with said strip, said diaphragm having a surface thereof polished to reduce contrast.

HENRY J. HOOD.